US009224992B2

(12) United States Patent
Yoon (10) Patent No.: US 9,224,992 B2
(45) Date of Patent: Dec. 29, 2015

(54) SECONDARY BATTERY (75) Inventor: Jangho Yoon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 534 days.

(21) Appl. No.: 13/303,017

(22) Filed: Nov. 22, 2011

(65) Prior Publication Data

US 2012/0214054 A1 Aug. 23, 2012

(30) Foreign Application Priority Data

Feb. 22, 2011 (KR) .................. 10-2011-0015530

(51) Int. Cl.
*H01M 2/04* (2006.01)
*H01M 2/12* (2006.01)

(52) U.S. Cl.
CPC .......... *H01M 2/0404* (2013.01); *H01M 2/0473* (2013.01); *H01M 2/1229* (2013.01); *H01M 2/0469* (2013.01); *H01M 2/1241* (2013.01)

(58) Field of Classification Search
CPC ............ H01M 2/0404; H01M 2/1229; H01M 2/0473; H01M 2/0469; H01M 2/1241
USPC .............. 429/53, 82, 174, 175, 179, 185, 181
See application file for complete search history.

(56) References Cited

U.S. PATENT DOCUMENTS

| 2006/0216592 | A1* | 9/2006 | Chun | .............................. 429/175 |
| 2007/0202396 | A1 | 8/2007 | Jung | |
| 2010/0316905 | A1* | 12/2010 | Maeng | ........................... 429/163 |
| 2012/0208075 | A1* | 8/2012 | Lim | .............................. 429/179 |

FOREIGN PATENT DOCUMENTS

| JP | 11-297292 A | 10/1999 |
| JP | 2002-304973 | 10/2002 |
| JP | 2010-040445 A | 2/2010 |
| KR | 2003-0053600 | 7/2003 |
| KR | 2007-0089420 | 8/2007 |
| KR | 2001-0048100 | 6/2011 |

OTHER PUBLICATIONS

Notice of Allowance dated Jan. 14, 2013 for corresponding Application KR 10-2011-0015530.
Office Action dated Jul. 13, 2012 for corresponding KR Application No. 10-2011-0015530.

* cited by examiner

*Primary Examiner* — Jonathan Jelsma
*Assistant Examiner* — Omar Kekia
(74) *Attorney, Agent, or Firm* — Knobbe Martens Olson & Bear LLP (57) ABSTRACT

A secondary battery capable of preventing an internal electric short by allowing an upper cap plate to be deformed toward the outside of a can and having improved stability under external impacts. The secondary battery includes a can having an internal space, an electrode assembly inserted into the space of the can, and a cap plate coupled to a top portion of the can, wherein the cap plate includes a deformation inducing part having a groove formed on its one surface.

21 Claims, 9 Drawing Sheets

SECONDARY BATTERY

CROSS-REFERENCE TO RELATED APPLICATION

This application claims priority to and the benefit of Korean Patent Application No. 10-2011-0015530, filed on Feb. 22, 2011, the entire content of which is incorporated herein by reference.

BACKGROUND OF THE INVENTION

1. Field of the Invention

Embodiments of the present invention relate to a secondary battery.

2. Description of the Related Art

A secondary battery is reusable because it can be charged and recharged. Due to its reusability, the secondary battery may be employed as a power source for a computer (e.g., a notebook computer or a laptop computer), a portable communication device (e.g., a mobile phone and a camcorder), etc.

Electric vehicles have been under development to reduce the environmental pollution due to exhaust gas from vehicles utilizing internal combustion engines. In order to apply the secondary battery to an electric vehicle, the development of an economical, high-speed chargeable, stable, and high-energy capacity secondary battery is desired.

A secondary battery can often be classified as either a lead battery, a nickel/cadmium (Ni/Cd) battery, a nickel/metal hydride (Ni/MH) battery or a lithium ion battery according to its negative electrode material and/or positive electrode material. Potential and energy density of the secondary battery is determined by properties of the electrode material. The lithium ion battery with its lithium electrode material can be used as a power source for a portable electronic device and for an electric vehicle because the energy density of lithium is relatively high due to a low redox potential and low molecular weight.

However, when the secondary battery is incorporated into a product, it is exposed to external impacts during use. Accordingly, a secondary battery having improved stability under external impacts is needed.

SUMMARY OF THE INVENTION

Embodiments of the present invention provide a secondary battery capable of inhibiting an internal electric short by allowing an upper cap plate to be deformed toward the outside of a can and having improved stability under external impacts.

According to an embodiment of the present invention, a secondary battery is provided, including a can having an internal space, an electrode assembly inserted into the space of the can, and a cap plate coupled to a top portion of the can, wherein the cap plate includes a deformation inducing part having a groove formed on its one surface.

The deformation inducing part may be thinner than other regions of the cap plate.

The groove forming the deformation inducing part may be formed to a depth of 20% to 80% based on a thickness of the cap plate.

The deformation inducing part may be formed on a top surface of the cap plate.

In addition, the deformation inducing part may be formed on one surface of the cap plate along at least one direction of a lengthwise direction and a widthwise direction of the cap plate, or a combination thereof.

Further, the deformation inducing part may be formed to extend from one end to the other end of an entire surface of the cap plate along at least one direction of a lengthwise direction and a widthwise direction of the cap plate, or a combination thereof.

In addition, the deformation inducing part formed along the lengthwise direction of the cap plate may be centrally formed based on the width of the cap plate.

The deformation inducing part formed along the widthwise direction of the cap plate is centrally formed based on the length of the cap plate.

In addition, the deformation inducing part formed along the widthwise direction of the cap plate may include a plurality of deformation inducing parts.

The deformation inducing parts formed along the widthwise direction of the cap plate may be disposed to be symmetrical in view of the center of the length of the cap plate.

In addition, the deformation inducing part may include a groove formed along the lengthwise direction of the cap plate and one or more support portions formed across the center of the groove.

The support portion and the cap plate may have the same thickness.

In addition, the support portion may be formed to be perpendicular to lengthwise direction of the groove.

The deformation inducing part may form a lower portion of the groove and may further include a protrusion extending from the cap plate.

The protrusion may extend toward a bottom surface of the cap plate.

In addition, the protrusion may have a smaller thickness than other regions of the cap plate.

A protruding height of the protrusion extending from the cap plate may be 70% or less based on a depth of the groove.

The deformation inducing part may further include at least one notch formed along the groove in parallel.

The notch may include a plurality of notches formed to be symmetrical with respect to the groove.

As described above, since the secondary battery according to the embodiment of the present invention includes a deformation inducing part shaped of a groove formed by engraving a top surface of a cap plate, the cap plate is deformed to protrude upwardly under external impacts such that it is bent along the deformation inducing part, thereby inhibiting internal components of a can from being electrically short-circuited, ultimately increasing the stability of the secondary battery.

In addition, the secondary battery according to the embodiment of the present invention includes a protrusion that separates a groove of the deformation inducing part or a support portion forming a lower portion of a groove and extending toward a bottom surface of the cap plate, thereby allowing the cap plate to be deformed only when an external pressure exceeds a reference pressure, ultimately improving the reliability of the secondary battery.

Additional aspects and/or advantages of the invention will be set forth in part in the description which follows and, in part, will be apparent from the description, or may be learned by practice of the invention.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

Hereinafter, embodiments of the present invention will be described in detail with reference to the accompanying drawings such that they can easily be made and used by those skilled in the art.

Figure 1:
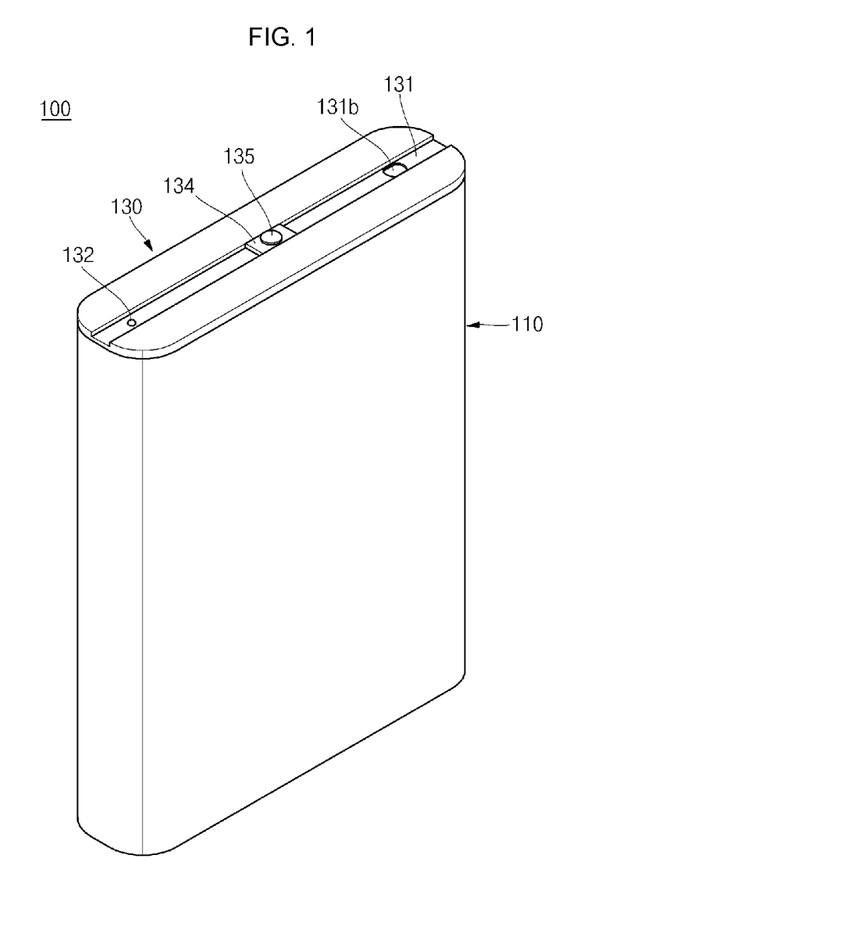
FIG. 1 is a perspective view illustrating a secondary battery according to an embodiment of the present invention.
Figure 2:
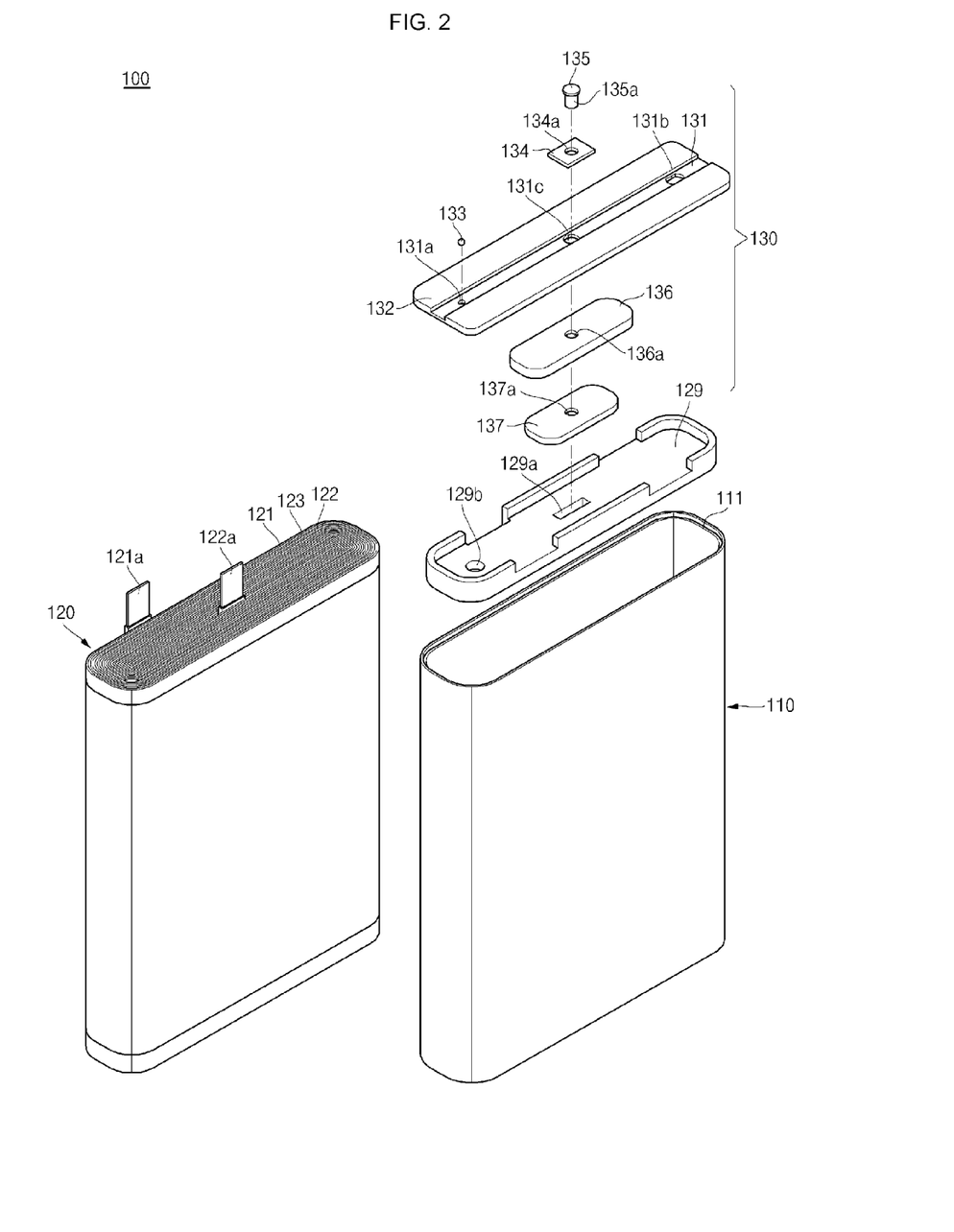
FIG. 2 is an exploded perspective view illustrating the secondary battery shown in FIG. 1.
Figure 3:
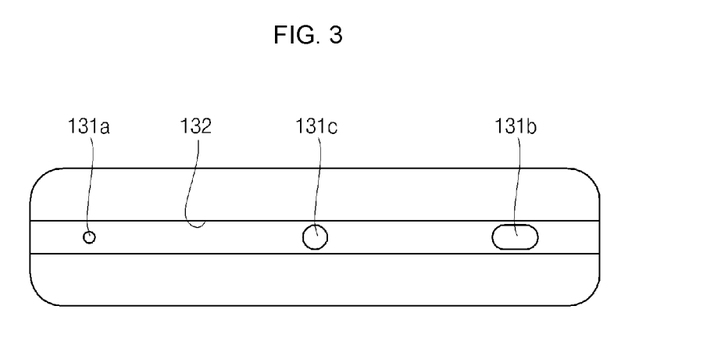
FIG. 3 is a plan view illustrating a cap plate of the secondary battery shown in FIG. 1.
Figure 4:
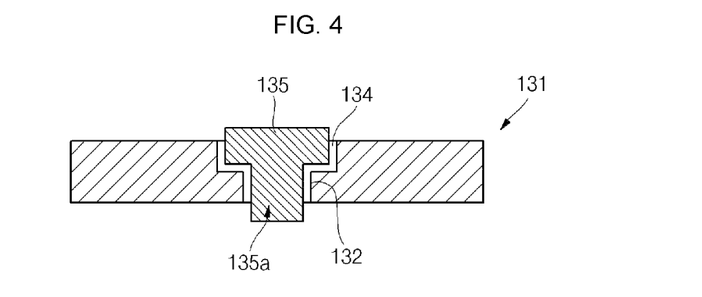
FIG. 4 is a cross-sectional view illustrating a state in which an electrode terminal is coupled to the cap plate of the secondary battery shown in FIG. 1.

A configuration of a secondary battery according to an embodiment of the present invention will now be described. FIG. 1 is a perspective view illustrating a secondary battery according to an embodiment of the present invention, FIG. 2 is an exploded perspective view illustrating the secondary battery shown in FIG. 1, FIG. 3 is a plan view illustrating a cap plate of the secondary battery shown in FIG. 1, and FIG. 4 is a cross-sectional view illustrating a state in which an electrode terminal is coupled to the cap plate of the secondary battery shown in FIG. 1.

Referring to FIGS. 1 to 4, the secondary battery 100 according to the embodiment of the present invention includes a can 110, an electrode assembly 120, and a cap assembly 130.

The can 110 has a substantially rectangular parallelepiped shape. The can 110 has an internal space and a top opening. The can 110 may be made of aluminum (Al), iron (Fe), or alloys thereof. In addition, the can 110 may have an inner surface that is electrically insulated. The can 110 includes a groove 111 formed along its upper periphery so that an insulation case 129 of the cap assembly 130 is safety mounted in the groove 111.

The electrode assembly 120 is inserted into the space of the can 110. The electrode assembly 120 includes a positive electrode plate 121 on which a positive electrode active material (not shown) such as lithium cobalt oxide (LiCoO2) is coated, a negative electrode plate 122 on which a negative electrode active material (not shown) such as graphite is coated, and a separator 123 disposed between the positive electrode plate 121 and the negative electrode plate 122 to prevent or reduce electric shorts and to enable movement of lithium ions. The positive electrode plate 121, the negative electrode plate 122, and the separator 123 are wound several times into a jelly roll shape, and then accommodated in the can 110. The positive electrode plate 121 may be made of aluminum (Al) foil, the negative electrode plate may be made of copper (Cu) foil, and the separator 123 may be made of polyethylene (PE) or polypropylene (PP).

An upwardly extended positive lead 121a is coupled to the positive electrode plate 121, and an upwardly extended negative lead 122a is coupled to the negative electrode plate 122. The positive lead 121 a may be made of aluminum (Al), and the negative lead 122a may be made of nickel (Ni).

An electrolyte (not shown) is injected into the can 110, and is positioned between the positive electrode plate 121 and the negative electrode plate 122 of the electrode assembly 120. The electrolyte may be a non-aqueous organic electrolyte such as a mixture of lithium salt and highly pure organic solvents. Further, the electrolyte may be made of polymeric materials. The electrolyte serves as a medium through which lithium ions are generated due to the electrochemical reactions between the positive electrode plate 121 and the negative electrode plate 122 during charging and discharging of the battery move.

An insulating case 129 may additionally be coupled to the opening 116 of the can 110 at the top of the electrode assembly 120. A lead through-hole 129a may be formed in the insulation case 129 such that the negative electrode lead 122a passes through the lead hole 129a. An electrolyte inlet 129b may be formed in the insulation case 129 such that an electrolyte injected through the cap plate 131 may easily flow into the electrode assembly 120.

The cap assembly 130 is coupled to a top portion of the can 110. The cap plate 131 is generally formed to a thickness of 1 mm to 1.5 mm. The cap assembly 130 includes the cap plate 131, a plug 133, an insulation gasket 134, an electrode terminal 135, an insulation plate 136, and a terminal plate 137.

Specifically, the cap plate 131 is coupled to the opening of the can 110 and has a plate shape with long and short sides. When the cap plate 131 is coupled to the opening of the can 110, a peripheral portion of the cap plate 131 is welded to seal the can 110.

The cap plate 131 includes a deformation inducing part 132 formed lengthwise on a top surface opposite to a surface facing the can 110. The deformation inducing part 132 is formed by forming a groove on a portion of the top surface of the cap plate 131. That is to say, the deformation inducing part 132 is thinner than other regions of the cap plate 131. Since the deformation inducing part 132 is relatively thin along the lengthwise direction of the cap plate 131, the cap plate 131 is more likely to be bent about the center of the deformation inducing part 132 when external impacts are applied in the widthwise direction of the cap plate 131. That is to say, when the deformation inducing part 132 is bent, this results in the deformation allowing the cap plate 131 to protrude outwardly from the top portion of the can 110, so that the cap plate 131 contacts the electrode assembly 120 positioned inside the can 110. Accordingly, the electrode assembly 120 is inhibited from being electrically short-circuited. Therefore, the secondary battery 100 according to the embodiment of the present invention, can inhibit internal electric shorts even under external impacts, thereby improving the electrical reliability of the battery.

Alternatively, the deformation inducing part 132 may be formed along the entire length of the cap plate 131. That is to say, the deformation inducing part 132 may be formed to extend from one end to the other end of the cap plate 131 along the lengthwise direction of the cap plate 131. In this case, since the deformation inducing part 132 may serve as a guide for deformation of the cap plate 131, the cap plate 131 may be easily bent along the deformation inducing part 132 under external impacts that are applied widthwise.

The groove forming the deformation inducing part 132 may be formed to a depth of 20% to 80% based on a thickness of the cap plate 131. If the groove forming the deformation inducing part 132 is formed to a depth of greater than or equal to 20% to up to 80%, the deformation inducing part 132 can more easily induce deformation of the cap plate 131. If the groove forming the deformation inducing part 132 is formed to a depth of smaller than or equal to 80%, the cap plate 131 can be prevented from being deformed thereby securing durability and reliability.

The cap plate 131 includes an electrolyte injection hole 131a for injecting an electrolyte into the can 110 at one side of the deformation inducing part 132. The electrolyte injection hole 131a is coupled to the plug 133 which seals the the electrolyte injection hole 131a. Further, the cap plate 131 includes a safety vent 131b that is relatively thin provided at the other side of the deformation inducing part 132.

The safety vent 131b is opened when the internal gas pressure of the can 110 exceeds a reference pressure, releasing the gas, thereby improving the safety of the can 110.

In addition, the cap plate 131 includes a hole 131c formed roughly at the center of the deformation inducing part 132. The hole 131c is coupled to the insulation gasket 134.

The electrode terminal 135 and the insulation gasket 134 are engaged with a hole 134a formed in the insulation gasket 134. A lower portion 135a of the electrode terminal 135 may pass through the hole 134a of the insulation gasket 134 and the hole 131c of the cap plate 131 to then be connected to the negative electrode lead 122a. The positive electrode lead 121a may be connected to the lower surface of the cap plate 131, or vice versa.

The insulation plate 136 is positioned on the lower surface of the cap plate 131, and the electrode terminal 135 is engaged with a hole 136c of the insulation plate 136. The lower portion 135a of the electrode terminal 135 passes through the hole 136c of the electrode terminal 135.

The terminal plate 137 is positioned on the lower surface of the insulation plate 136. The electrode terminal 135 is engaged with the hole 137a of the terminal plate 137, and the electrode terminal 135 is electrically connected to the negative electrode lead 122a.

Hereinafter, an operation in which the cap plate is bent when external impacts are applied to the secondary battery according to the embodiment of the present invention is described in more detail.

Figure 5A:
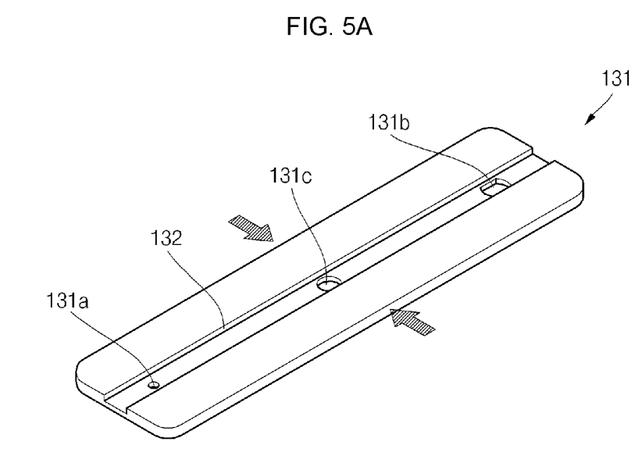
FIG. 5A illustrates a direction in which external impacts are applied to the secondary battery shown in FIG. 1.
Figure 5B:
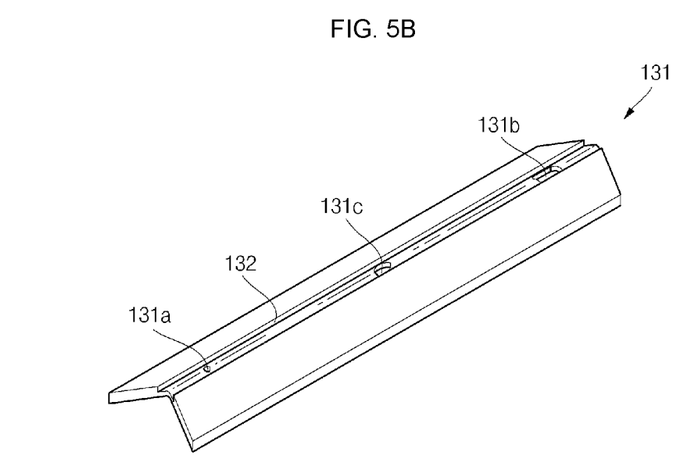
FIG. 5B illustrates that the cap plate is bent due to the external impacts applied to the secondary battery shown in FIG. 1.

FIG. 5A illustrates a direction in which external impacts are applied to the secondary battery shown in FIG. 1, and FIG. 5B illustrates that the cap plate is bent due to the external impacts applied to the secondary battery shown in FIG. 1.

Referring first to FIG. 5A, pressures derived from external impacts are applied in a widthwise direction of the secondary battery 100 according to the embodiment of the present invention. The pressures are transferred to the cap plate 131 along directions indicated by arrows.

Referring to FIG. 5B, the cap plate 131 is bent due to the pressure. Here, the cap plate 131 is bent such that left and right sides of the cap plate 131 are folded about the deformation inducing part 132. This is because the deformation inducing part 132 is thinner than other regions of the cap plate 131. The deformation inducing part 132 is bent by the externally applied pressure. Accordingly, a region where the deformation inducing part 132 of the cap plate 131 is formed may protrude outward from the upper end of the can 110. Since the cap plate 131 protrudes outward from the top portion of the can 110 formed under the cap plate 131, the electrode assembly 120 positioned inside the cap plate 131 can be inhibited from being short-circuited from the can 110. Therefore, as described above, even when the pressure derived external impacts are applied, the electrical reliability of the secondary battery 100 can be improved.

A configuration of a secondary battery according to still another embodiment of the present invention will now be described.

Figure 6:
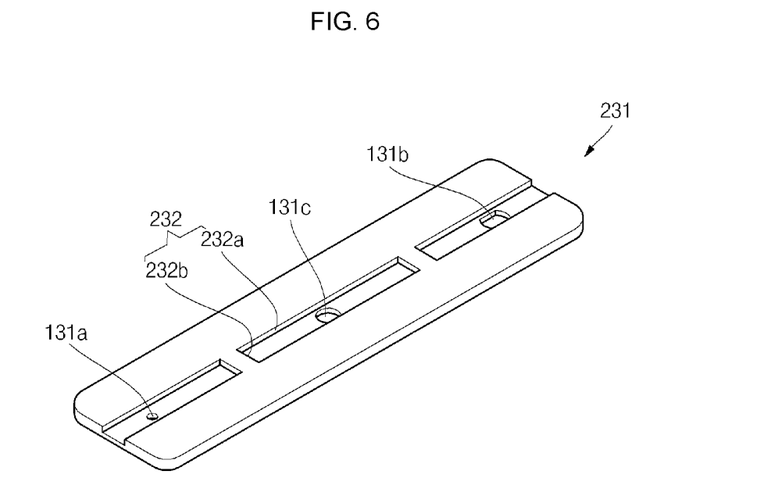
FIG. 6 is a perspective view illustrating a cap plate of a secondary battery according to another embodiment of the present invention.
Figure 7:
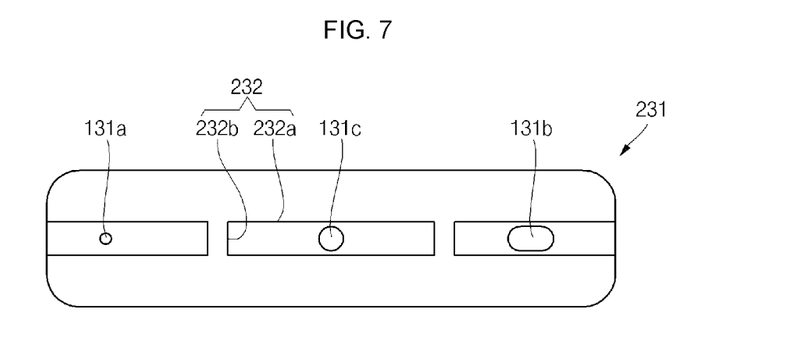
FIG. 7 is a plan view illustrating the cap plate shown in FIG. 6.

FIG. 6 is a perspective view illustrating a cap plate of a secondary battery according to another embodiment of the present invention and FIG. 7 is a plan view illustrating the cap plate shown in FIG. 6.

In this embodiment of the present invention, the same functional components as those of the previous embodiment are denoted by the same reference numerals, and the following description will focus on differences between the two embodiments.

Referring to FIGS. 6 and 7, the secondary battery according to the embodiment of the present invention includes a can, an electrode assembly, and a cap assembly.

The cap assembly includes a cap plate 231. The cap assembly may also include a plug, an insulation gasket, an electrode terminal, an insulation plate, and a terminal plate, which are substantially the same as those of the previous embodiment, and a detailed description thereof will be omitted.

The cap plate 231 includes a deformation inducing part 232 formed lengthwise on its top surface. The deformation inducing part 232 is formed on a portion of the top surface of the cap plate 231 to be thinner than other regions of the cap plate 231.

The deformation inducing part 232 includes a groove 232a formed lengthwise in the cap plate 231, and a support portion 232b formed widthwise in the cap plate 231.

Like in the previous embodiment, the groove 232a may be formed along the lengthwise direction of the cap plate 231. When an external pressure is applied to the cap plate 231, the cap plate 231 is bent about the groove 232a, thereby inhibiting internal components of the can from being short-circuited.

The support portion 232b may be formed to be perpendicular to the groove 232a along the lengthwise direction of the cap plate 231. The support portion 232b includes one or more support portions and may be arranged along the groove 232a.

That is to say, the support portion 232b includes one or more support portions at the groove 232a of the cap plate 231 such that the groove 232a is formed in a disconnected shape. The support portion 232b may have the same thickness as a region other than the groove 232a in the cap plate 231. The support portion 232b allows the deformation inducing part 232 to withstand a reference pressure by securing the strength of the deformation inducing part 232 even though an overall deformation of the deformation inducing part 232 is a little restricted. That is to say, the support portion 232b allows the deformation inducing part 232 to withstand an external pressure until the reference pressure is reached. In addition, when the external pressure exceeds the reference pressure, the deformation inducing part 232 may be deformed through the groove 232a.

A configuration of a secondary battery according to still another embodiment of the present invention will now be described.

Figure 8:
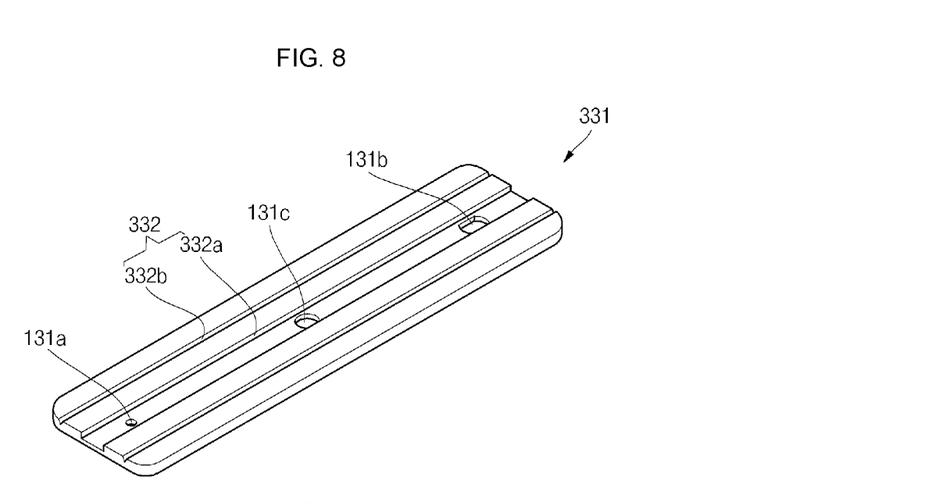
FIG. 8 is a perspective view illustrating a cap plate of a secondary battery according to still another embodiment of the present invention.
Figure 9:
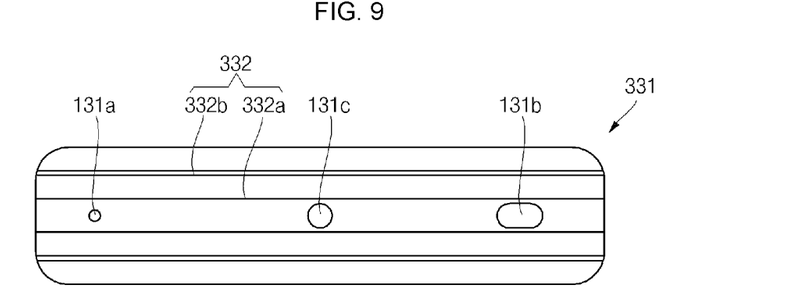
FIG. 9 is a plan view illustrating the cap plate shown in FIG. 8.
Figure 10:
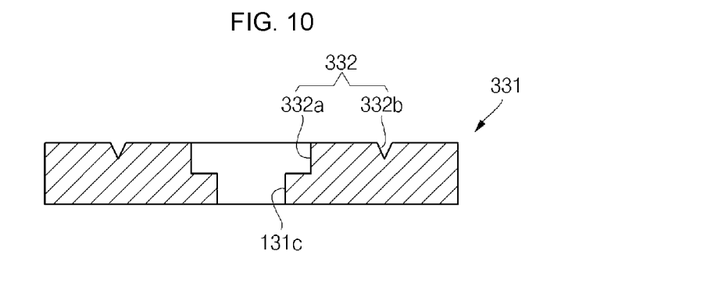
FIG. 10 is a cross-sectional view illustrating the cap plate shown in FIG. 8.

FIG. 8 is a perspective view illustrating a cap plate of a secondary battery according to still another embodiment of the present invention, FIG. 9 is a plan view illustrating the cap plate shown in FIG. 8, and FIG. 10 is a cross-sectional view illustrating the cap plate shown in FIG. 8.

Referring to FIGS. 8 to 10, the secondary battery according to the embodiment of the present invention includes a can, an electrode assembly, and a cap assembly.

The cap assembly includes a cap plate 331. The cap assembly includes a plug, an insulation gasket, an electrode terminal, an insulation plate, and a terminal plate, which are substantially the same as those of the previous embodiment, and a detailed description thereof will be omitted.

The cap plate 331 includes a deformation inducing part 332 having a groove 332a and at least one notch 332b formed in parallel with the groove 332a, formed lengthwise. The groove 332a of the deformation inducing part 332 is substantially the same as that of the previous embodiment.

The notch 332b includes one or more notches to be parallel with the groove 332a. Since the notch 332b is substantially parallel with the groove 332a, it can be more easily deformed when an external pressure is applied to a top portion of the cap plate 331. For example, in the embodiment of the present invention in which the notch 332b is formed at opposing sides of the groove 332a, when external pressures of opposing widthwise directions are asymmetrically applied to the cap plate 331, the cap plate 331 is first bent at the notch 332b positioned closer to the external pressure applied, thereby inducing the overall deformation of the cap plate 331. In addition, the cap plate 331 is upwardly bent at the notch 332b as well as at the groove 332a, thereby achieving deformation of the cap plate 331 uniformly over the top surface of the cap plate 331. Therefore, deformation of the cap plate 331 derived from the pressure applied to the cap plate 331 can be dispersed, thereby more effectively preventing internal components of the can from being short-circuited.

A configuration of a secondary battery according to still another embodiment of the present invention will now be described.

Figure 11:
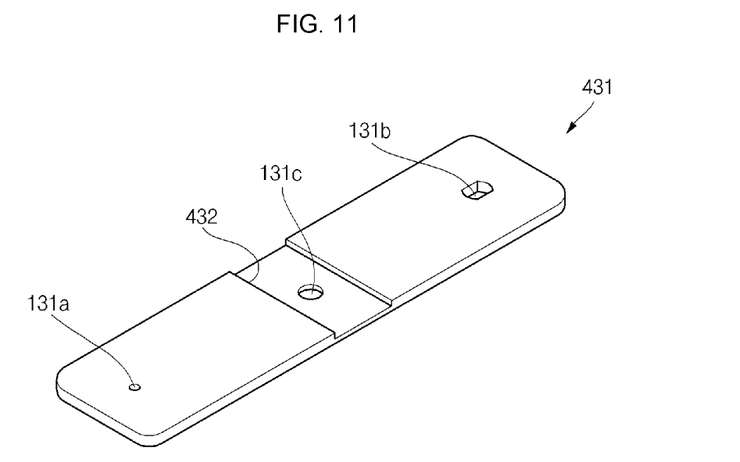
FIG. 11 is a perspective view illustrating a cap plate of a secondary battery according to still another embodiment of the present invention.
Figure 12:
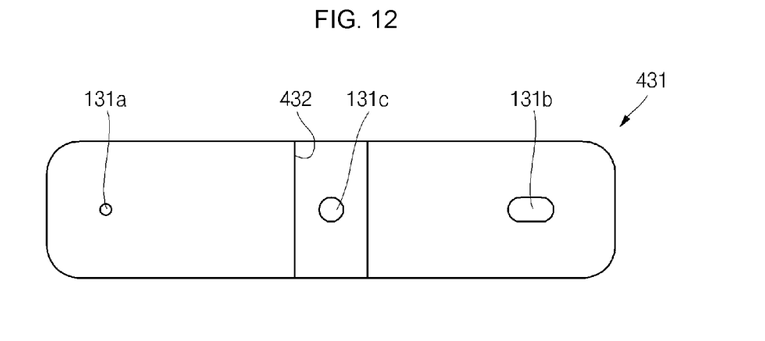
FIG. 12 is a cross-sectional view illustrating the cap plate shown in FIG. 11.

FIG. 11 is a perspective view illustrating a cap plate of a secondary battery according to still another embodiment of the present invention and FIG. 12 is a cross-sectional view illustrating the cap plate shown in FIG. 11.

Referring to FIGS. 11 to 12, the secondary battery according to the embodiment of the present invention includes a can, an electrode assembly, and a cap assembly.

The cap assembly includes a cap plate 431. The cap assembly includes a plug, an insulation gasket, an electrode terminal, an insulation plate, and a terminal plate, which are substantially the same as those of the previous embodiment, and a detailed description thereof will be omitted.

The cap plate 431 includes a deformation inducing part 432 formed in the widthwise direction.

Unlike in the previous embodiment, in this embodiment of the present invention, the deformation inducing part 432 is formed in the widthwise direction of the cap plate 431, that is, in a short side direction of the deformation inducing part 432 based on the long side of the cap plate 431. If an external pressure is applied in the lengthwise direction of the cap plate 431, the deformation inducing part 432 causes the cap plate 431 to be bent. Specifically, the deformation inducing part 432 allows the cap plate 431 to be upwardly bent, thereby inhibiting internal components of the can from being short-circuited. In addition, the deformation inducing part 432 is formed along the entirely widthwise direction. That is to say, the deformation inducing part 432 extends from one end to the other end along the widthwise direction of the cap plate 431, thereby allowing the cap plate 431 to be easily bent.

A configuration of a secondary battery according to still another embodiment of the present invention will now be described.

Figure 13:
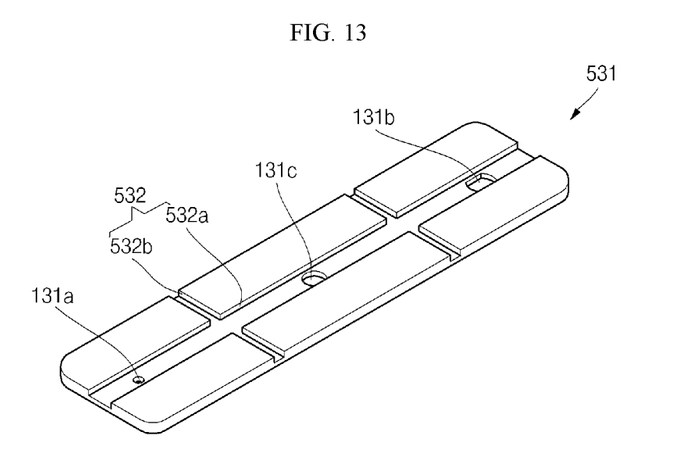
FIG. 13 is a perspective view illustrating a cap plate of a secondary battery according to still another embodiment of the present invention.
Figure 14:
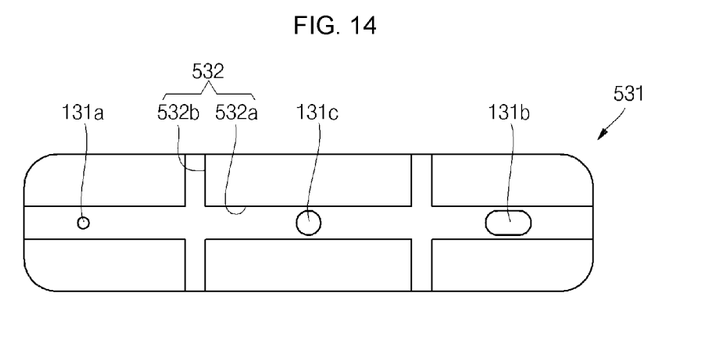
FIG. 14 is a plan view illustrating the cap plate shown in FIG. 13.

FIG. 13 is a perspective view illustrating a cap plate of a secondary battery according to still another embodiment of the present invention and FIG. 14 is a plan view illustrating the cap plate shown in FIG. 13.

Referring to FIGS. 13 and 14, the secondary battery according to the embodiment of the present invention includes a cap assembly having a cap plate 531.

The cap plate 531 includes a deformation inducing part 532 having a first groove 532a formed lengthwise and a second groove 532b formed widthwise.

The first groove 532a of the deformation inducing part 532 is formed along the lengthwise direction of the cap plate 531, that is, in parallel with the long side direction of the cap plate 531. The first groove 532a is deformed when an external pressure is applied to the cap plate 531 widthwise, that is, in parallel with the short side of the cap plate 531. In this case, the cap plate 531 is bent along the first groove 532a, thereby preventing the electrode assembly positioned in the can from being short-circuited.

The second groove 532b is formed along the widthwise direction of the cap plate 531, that is, in parallel with the short side of the cap plate 531. The second groove 532b is deformed when an external pressure is applied to the cap plate 531 lengthwise, that is, in parallel with the long side of the cap plate 531. In this case, the cap plate 531 is bent along the second groove 532b, thereby preventing the electrode assembly positioned in the can from being short-circuited.

Therefore, the cap plate 531 is bent along the first groove 532a and the second groove 532b causing the deformation inducing part 532 to then upwardly protrude, thereby inhibiting internal components of the can from being short-circuited.

A configuration of a secondary battery according to still another embodiment of the present invention will now be described.

Figure 15:
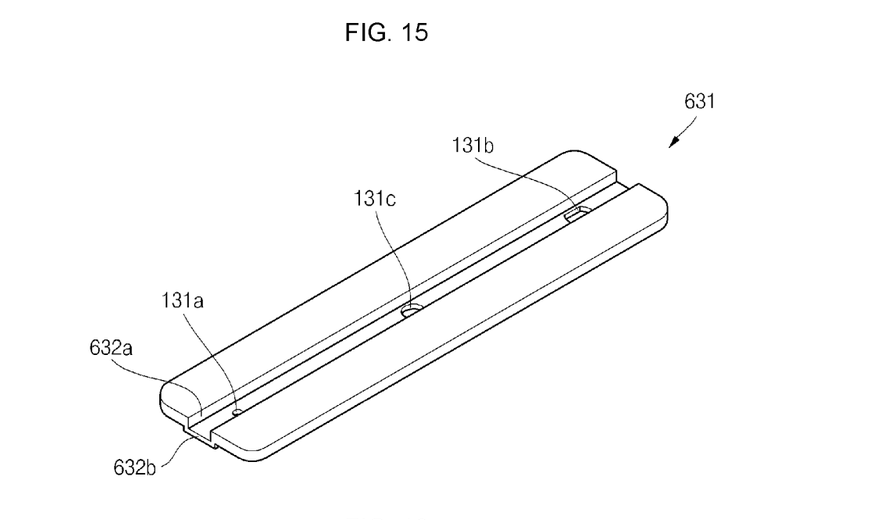
FIG. 15 is a perspective view illustrating a cap plate of a secondary battery according to still another embodiment of the present invention.
Figure 16:
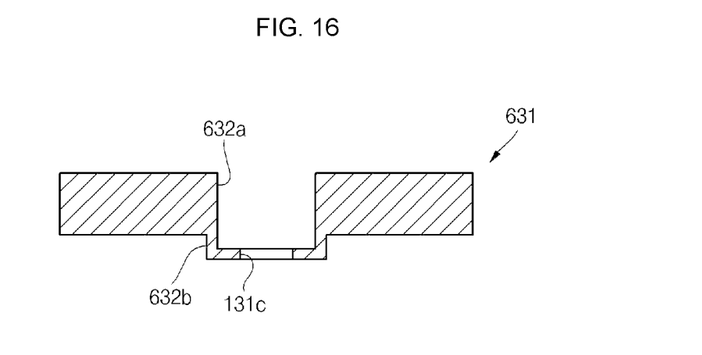
FIG. 16 is a cross-sectional view illustrating the cap plate shown in FIG. 15.

FIG. 15 is a perspective view illustrating a cap plate of a secondary battery according to still another embodiment of the present invention, and FIG. 16 is a cross-sectional view illustrating the cap plate shown in FIG. 15.

Referring to FIGS. 15 and 16, the secondary battery according to the embodiment of the present invention includes a cap assembly having a cap plate 631.

The cap plate 631 includes a deformation inducing part formed lengthwise. The deformation inducing part includes a groove 632a formed on a top surface of the cap plate 631 and a protrusion 632b formed under the groove 632a and downwardly protruding from the cap plate 631.

The groove 632a of the embodiment of the present invention, forming the deformation inducing part 631, performs the same function as in the previous embodiment.

The protrusion 632b forms a lower portion of the groove 632a. The protrusion 632b protrudes toward a bottom surface of the cap plate 631. The protrusion 632b secures the overall strength of the cap plate 631. Therefore, the protrusion 632b allows the cap plate 631 to be deformed only when an external pressure applied to the cap plate 631 exceeds a reference pressure while allowing the cap plate 631 to withstand the external pressure until the reference pressure is reached. The cap plate 631 is bent about the protrusion 632b and is deformed such that the center of the cap plate 631 upwardly protrudes. Therefore, as described above, it is possible to more easily prevent internal components of the can from being short-circuited.

A protruding height of the protrusion 632b extending from the cap plate 631 may be 70% or less based on a depth of the groove 632a. When the protrusion 632b is 70% or less based on the depth of the groove 632a, the protrusion 632b is more easily formed in the cap plate 631, thereby increasing the manufacturability. In addition, since the groove 632a is formed on the protrusion 632b, the protrusion 632b allows the cap plate 631 to be more easily bent as long as the protrusion 632b protrudes from the bottom surface of the cap plate 631.

While this invention has been described in connection with what is presently considered to be practical exemplary embodiments, it is to be understood that the invention is not limited to the disclosed embodiments, but, rather is intended to cover various modifications and equivalent arrangements included within the spirit and scope of the appended claims.

What is claimed is:

1. A secondary battery comprising:
    a can having an internal space;
    an electrode assembly inserted into the internal space of the can; and
    a cap plate coupled to a top portion of the can having a width and a length,
    wherein the cap plate includes a deformation inducing part formed by a groove formed on a surface of the cap plate, wherein the groove extends the entire length of the cap plate, and wherein the cap plate includes an opening for the electrode that is formed in the groove.

2. The secondary battery of claim 1, wherein the deformation inducing part is thinner than other regions of the cap plate.

3. The secondary battery of claim 1, wherein the groove forming the deformation inducing part is formed to a depth of 20% to 80% based on a thickness of the cap plate.

4. The secondary battery of claim 1, wherein the deformation inducing part is formed on a top surface of the cap plate.

5. The secondary battery of claim 1, wherein the deformation inducing part is formed on one surface of the cap plate along at least one direction of a lengthwise direction and a widthwise direction of the cap plate, or a combination thereof.

6. The secondary battery of claim 5, wherein the deformation inducing part is formed to extend from one end to the other end of an entire surface of the cap plate along at least one direction of a lengthwise direction and a widthwise direction of the cap plate, or a combination thereof.

7. The secondary battery of claim 5, wherein the deformation inducing part formed along the lengthwise direction of the cap plate is centrally formed based on the width of the cap plate.

8. The secondary battery of claim 5, wherein the deformation inducing part formed along the widthwise direction of the cap plate is centrally formed based on the length of the cap plate.

9. The secondary battery of claim 5, wherein the deformation inducing part formed along the widthwise direction of the cap plate includes a plurality of deformation inducing parts.

10. The secondary battery of claim 9, wherein the deformation inducing parts formed along the widthwise direction of the cap plate are disposed to be symmetrical in view of the center of the length of the cap plate.

11. The secondary battery of claim 1, wherein the deformation inducing part includes a groove formed along the lengthwise direction of the cap plate and one or more support portions formed across the center of the groove.

12. The secondary battery of claim 11, wherein the support portion and the cap plate have the same thickness.

13. The secondary battery of claim 11, wherein the support portion is formed to be perpendicular to the lengthwise direction of the groove.

14. The secondary battery of claim 1, wherein the deformation inducing part forms a lower portion of the groove and further includes a protrusion extending from the cap plate.

15. The secondary battery of claim 14, wherein the protrusion extends toward a bottom surface of the cap plate.

16. The secondary battery of claim 14, wherein the protrusion has a smaller thickness than other regions of the cap plate.

17. The secondary battery of claim 14, wherein a protruding height of the protrusion extending from the cap plate is 70% or less based on a depth of the groove.

18. The secondary battery of claim 1, wherein the deformation inducing part further includes at least one notch formed along the groove in parallel.

19. The secondary battery of claim 18, wherein the notch includes a plurality of notches formed to be symmetrical with respect to the groove.

20. A secondary battery comprising:
    a can having an internal space;
    an electrode assembly inserted into the internal space of the can; and
    a cap plate having a length and a width coupled to a top portion of the can, wherein the cap plate is contoured to have a groove that extends the entire length of the cap plate such that external forces exerted against the can results in the cap plate deforming in a first direction away from the top portion of the can, and wherein the cap plate includes an opening for the electrode that is formed in the groove.

21. The secondary battery of claim 20, wherein the cap plate is contoured so as to be deformed in the first direction in response to pressures above a reference threshold.

\* \* \* \* \*